(12) United States Patent
Saxena et al.

(10) Patent No.: US 9,398,056 B2
(45) Date of Patent: Jul. 19, 2016

(54) SYSTEMS AND METHODS FOR ROOM SYSTEM PAIRING IN VIDEO CONFERENCING

(71) Applicant: Vidyo, Inc., Hackensack, NJ (US)

(72) Inventors: Manoj K. Saxena, Monroe Township, NJ (US); Alexandros Eleftheriadis, Tenafly, NJ (US)

(73) Assignee: VIDYO, INC., Hackensack, NJ (US)

( * ) Notice: Subject to any disclaimer, the term of this patent is extended or adjusted under 35 U.S.C. 154(b) by 0 days.

(21) Appl. No.: 14/293,818

(22) Filed: Jun. 2, 2014

(65) Prior Publication Data
US 2015/0029300 A1 Jan. 29, 2015

Related U.S. Application Data

(60) Provisional application No. 61/829,737, filed on May 31, 2013.

(51) Int. Cl.
*H04N 7/14* (2006.01)
*H04L 29/06* (2006.01)
*H04N 7/15* (2006.01)
*H04N 21/475* (2011.01)

(52) U.S. Cl.
CPC ........ *H04L 65/1069* (2013.01); *H04L 65/1063* (2013.01); *H04L 65/403* (2013.01); *H04N 7/14* (2013.01); *H04N 7/15* (2013.01); *H04N 21/4751* (2013.01)

(58) Field of Classification Search
CPC .......... H04M 2250/02; H04M 1/7253; H04M 2250/04; H04M 3/56; H04W 4/008; H04W 76/02; H04N 7/15
USPC ............................................ 348/14.01, 14.08
See application file for complete search history.

(56) References Cited

U.S. PATENT DOCUMENTS

| | | | |
|---|---|---|---|
| 2009/0081999 A1* | 3/2009 | Khasawneh et al. | 455/416 |
| 2011/0179182 A1* | 7/2011 | Vadla Ravnas | 709/227 |
| 2011/0279639 A1 | 11/2011 | Anand et al. | |
| 2012/0058754 A1* | 3/2012 | Couse et al. | 455/416 |

OTHER PUBLICATIONS

International Search Report and Written Opinion for PCT/US14/040518, dated Oct. 16, 2014.
Blue jeans "Blue Jeans" [online] published Apr. 13, 2013. [Retrieved on Sep. 13, 2014] Retrieved from the Internet URL:http://blujeans.com/sites/default/files/Blue-Jeans-Getting-Started-Guide.pdf.
(Continued)

*Primary Examiner* — Quoc D Tran
(74) *Attorney, Agent, or Firm* — Baker Botts L.L.P.

(57) ABSTRACT

Systems and methods for the pairing of room systems, and other systems that lack portability and a convenient user interface, to videoconferences are disclosed herein. In one embodiment of the disclosed subject matter, a user initiates room system pairing from his or her device. For example, the user can press a button on a remote control associated with the room system to set the system to pairing mode. The room system can register with a server that is controlling the videoconferencing system, which in turn can display the room system in a list of available room systems on the user's device. The user can have the option to select the particular room system, instructing the server to add the room system to the conference.

7 Claims, 7 Drawing Sheets

(56) References Cited

OTHER PUBLICATIONS

LDSTech, "Create a video conference" [online] published May 7, 2013 [Retrieved Sep. 13, 2014] Retrieved from the Internet URL:http://web.archive.org/web/20130507054424/http://tech.lds.org.wiki/Create_a_video_conference/..

Fryer, "Lessons Learned Videoconferencing on the BlueJeans Network" [online] published Dec. 30, 2011 [Retrieved Sep. 20, 2014] Retrieved from the Internet URL:http://www.speedofcreativity.org/2011/12/30/lessons-learned-videoconferencing-on-th-bluejeans-network-bluejeansnet-dec-2011/.

* cited by examiner

FIG. 1

Screenshots for setting up a room URL

Screenshots for adding a room system to a conference

SYSTEMS AND METHODS FOR ROOM SYSTEM PAIRING IN VIDEO CONFERENCING

CROSS-REFERENCE TO RELATED APPLICATIONS

This application claims priority to U.S. provisional patent application Ser. No. 61/829,737, filed May 31, 2013, incorporated by reference herein in its entirety.

FIELD

The disclosed subject matter relates to video conferencing systems, including systems that use dedicated, room-based facilities for audiovisual communication in combination with personal or portable devices.

BACKGROUND

Video communication systems continue to evolve. Historically, videoconferencing was often associated with bulky, room-based systems that involved dedicated hardware in permanent installations. As end-user devices such as personal computers and laptops became more powerful, it became increasingly feasible to conduct videoconferencing sessions using such devices as endpoints, including via built-in cameras in laptop computers.

The introduction of increasingly powerful smartphones and tablets has broadened the spectrum of possible endpoints. Equipped with high quality cameras and powerful processors, such devices are able to decode high definition video, although their encoding capability can be at a slightly lower level. The convenience associated with the form factor and portability of these devices has made them popular endpoints for video communication. As such, the user's main computer can remain free for performing other tasks.

While the range and variety of end-user devices continues to expand, a room-based endpoint configuration still can be relevant. For example, when more than a few people desire to gather in the same physical location, it can be convenient to conduct a meeting in an actual conference room and allow remote participants to connect. At the same time, such systems can offer increased screen real estate, i.e., actual physical screen space, so that dozens of participants can be shown at the same time.

Experience with use of videoconferencing systems in real business settings can show that users can initiate conference participation from their own personal devices, such as a smartphone, tablet, or laptop. These devices can be equipped with the relevant software and the user's credentials (e.g. user name, password, server address, etc.). Furthermore, these devices can have documents in various formats (e.g., Microsoft Word, Excel, or PowerPoint files) that a user may want to share (display) to other users.

Throughout the working day, the user can visit a number of conference rooms that may be equipped with videoconferencing systems. The user, however, may not know how to connect the particular room system to a videoconference in which the user wishes to participate. These systems can be controlled via a remote control, and entering information can be cumbersome.

There continues to be a need for systems and methods to facilitate the pairing of room systems, and similar systems that lack portability and convenient user interface, to videoconferences.

SUMMARY

Systems and methods for the pairing of room systems, and other systems that lack portability and a convenient user interface, to videoconferences are disclosed herein. In one embodiment of the disclosed subject matter, a user initiates room system pairing from his or her device. For example, the user can press a button on a remote control associated with the room system to set the system to pairing mode. The room system can register with a server that is controlling the videoconferencing system, which in turn can display the room system in a list of available room systems on the user's device. The user can have the option to select the particular room system, instructing the server to add the room system to the conference.

Throughout the figures, similar reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

Figure 1:
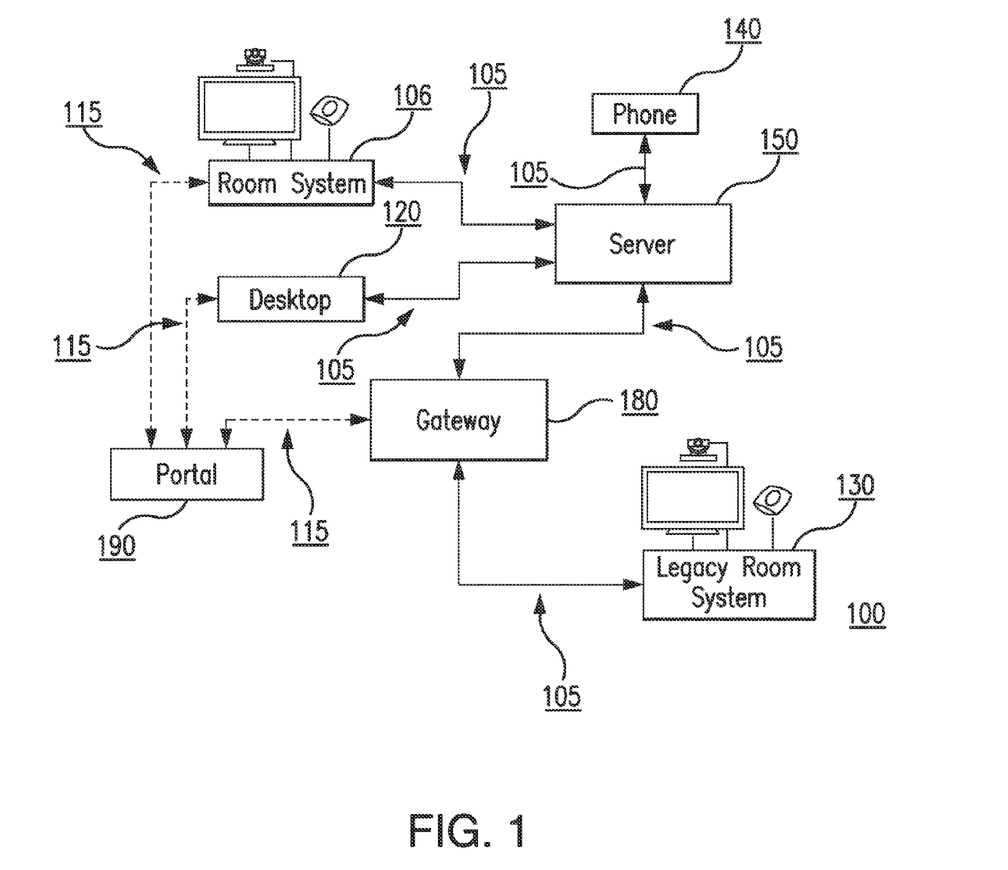
FIG. 1 depicts an exemplary architecture of a videoconferencing system in accordance with the disclosed subject matter with multiple types of clients.

FIG. 1 depicts an exemplary architecture of a videoconferencing system with multiple types of endpoints (or clients). The figure includes a Room System 110, a Phone 140, and a Desktop 120 (e.g., a Windows PC). These endpoints can be interconnected through a Server 150, to which they can connect using network connections 105. User and system administration can be performed at a Portal 190, which can communicate to the various system components through appropriate signaling connections 115 over a network. The system also shows a Gateway 180 which can be used to convert the video and audio formats that the endpoints can be using to other video and audio formats, so that other systems can be able to join the conference.

By way of example, FIG. 1 can show a Legacy Room System 130 that can connect to the Gateway 180. The Gateway 180 can connect to the Server 150, and can represent the Legacy Room System 130 in the conference. More or less Endpoints can be connected to the Server, and more than one Legacy Endpoint can connect to the Gateway, as is obvious to persons skilled in the art. Similarly, the system can feature more than one Server in a cascade or other configuration, and can also feature more than one Gateway. Examples of these systems can include the VidyoRoom (Room System 110), VidyoDesktop running on a PC (Desktop 120), Vidyo iPhone/ iPad application running on an iPhone or an iPad (Phone 140), VidyoRouter (Server 150), VidyoGateway (Gateway 180), and VidyoPortal (Portal 190) products offered commercially by Vidyo, Inc.

In an exemplary embodiment of the disclosed subject matter, a videoconference is associated with a "room." A room can be a virtual representation of a room and does not need to correspond to a physical room. Users in a videoconferencing system can be associated with at least one room, such as their own personal meeting room. This room can be used to conduct meetings with other users, and can be relevant for multi-party sessions. Physical rooms in the videoconferencing system can be associated with their own "user" accounts. In such a case, the user room associated with the user account of the physical room can correspond to that physical room. For example, a user account associated with a conference room in a hypothetical facility in New York could be called "NY-Boardroom." Example users Bob and Mary can have corresponding user accounts called "Bob" and "Mary," respectively. Each user, including the "NY-Boardroom" user, can have its own room on the videoconferencing server. Whereas Bob and Mary can be able to login from different locations and different devices (using a login and password), the "NY-Boardroom" user can be uniquely associated with the particular physical facility.

In an exemplary embodiment of the disclosed subject matter, users can connect to the videoconferencing system using a web-based portal. The portal can provide access control, where users can enter login and password information in order to access the system. It can also allow other administrative and management functions such as initiation of connections, searching for other users or rooms, etc.

Conference initiation can be performed using multiple techniques. By way of example, a user can place a direct person-to-person call to another user through the portal, for example if that user is running the corresponding client software and is also logged in on the system. The system can display an alert to the remote user through the client software and can offer to either accept or reject the call.

By way of example, for multi-party calls, a user can join a conference room. The portal can provide a list of users and their associated rooms, and can allow users to "join" a particular room. The portal also can manage a quick-access list of users for fast access to frequently-used rooms or users. For example, users can protect their rooms by requiring that a PIN (personal identification number, e.g., a four digit code), which can be entered prior to joining the conference.

Figure 2A:
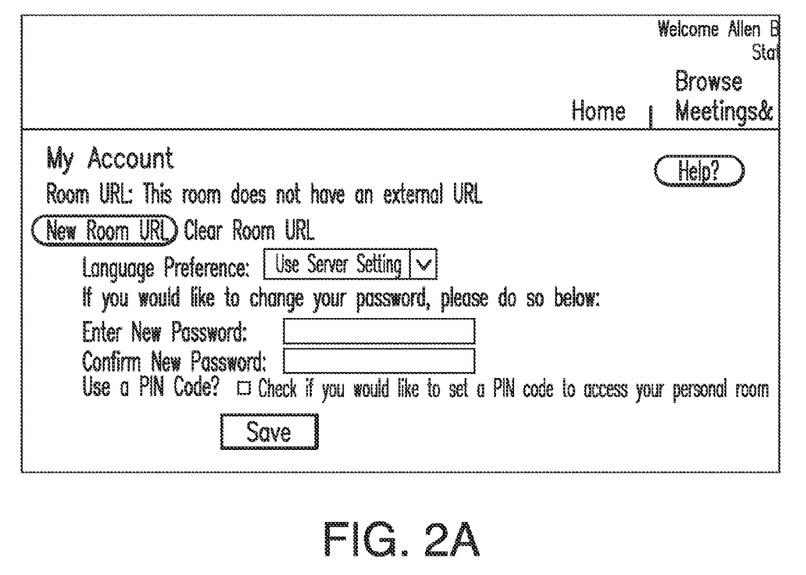
FIGS. 2A-B provide exemplary screen snapshots of the disclosed subject matter during the process of creating a room URL.
Figure 2B:
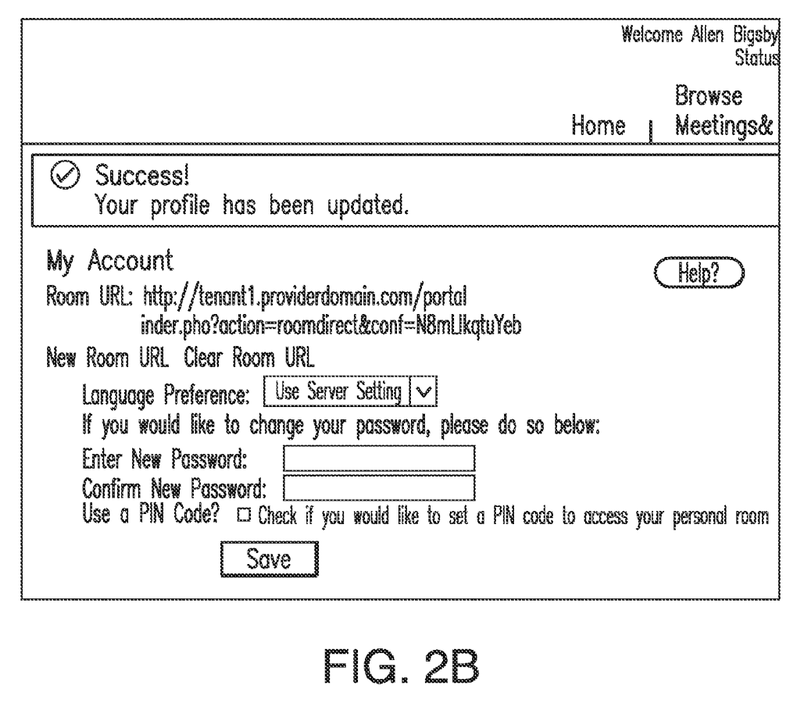

When scheduling a conference call, it can be useful to send to the invitees a URL that, when clicked, can bring the user into the conference. For this reason, a portal can associate a URL with a particular meeting room. FIGS. 2A-B depict an exemplary process of setting up a URL for a room on the portal of a videoconferencing system. For example, the user can log in on the portal by providing his/her login name and password. FIG. 2A depicts a page that can allow the user to create a unique URL associated with his/her room ("New Room URL" link). After the user has clicked on the "New Room URL" link, the system can create a unique URL and displays it on the portal page, as shown in FIG. 2B. In one example, the URL can be: "http://tenant1.providerdomain.com/portal/index.php?action=roomdirect&conf=N8mLlkqtuYeb". The room-specific portion can be the parameter value for "conf." The user can now send this URL to other users, e.g., via email or other means. A user that clicks on that URL can be taken directly into a conference in that particular room, which can occur after he/she is authenticated on the portal.

Some systems can allow users that have accounts on a portal to invite to a conference users that do not have accounts on that portal. These latter users can be referred to as "friends." The portal can allow users that access the portal's facilities through a room URL to select if they want to join as friends or to perform a full login.

Figure 3:
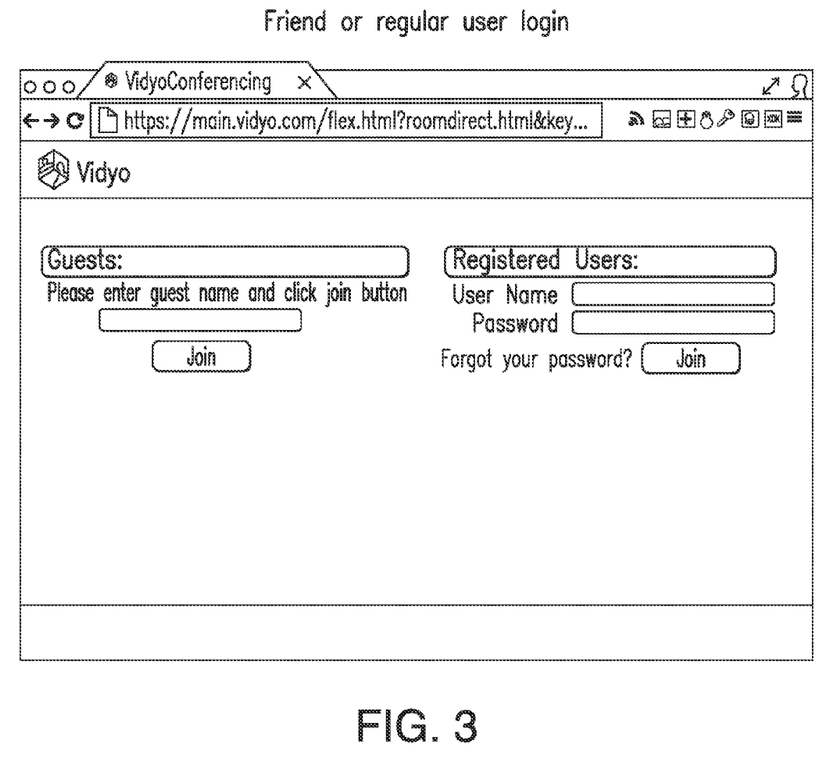
FIG. 3 provides an exemplary screen shot of the friend vs. regular user login on a portal.

FIG. 3 shows an exemplary page that the portal can display after a user accesses the room URL. As shown in FIG. 3, the portal can allow a user to join through the "Guests" side, in which case the user can provides a name and click the "Join" button. The portal also can allow a user to perform a full login if he/she is a registered user. In the latter case, the user can provide his/her user name and password in order to join the conference.

Using room URLs can offer convenience, e.g., because the URL can be emailed and/or added to an electronic meeting invitation, such as those generated by calendar programs including Microsoft Outlook, Microsoft Exchange, Apple Calendar, and others. The invited user can click on the meeting URL right on their calendars to join a conference call.

While this process can be convenient when a user is on a device that allows him/her to access his/her email or electronic calendar, it can be more difficult to use on a room system. Room systems can feature one or more large screens, can be equipped with high-quality video cameras, and can involve a microphone or microphone sets that can cover large rooms. Some exemplary room systems can lack a keyboard and can be operated from a remote control. Furthermore, some exemplary room systems may not offer any other application to the user except the conferencing application that they were designed to use.

For example, when a user wants to join a conference on a room system, the user can browse the portal in order to find the desired meeting room, and select it. In order to enter the name of the room, the user can use the remote. The system can facilitate the searching process by displaying partial matches on the screen, but entering data can be cumbersome.

In some exemplary cases, however, the user may not know the actual name of the room where the conference is taking place. For example, looking at the URLs shown in FIGS. 2A-3, the URL may not include the room name (at least not in a human-readable fashion). Upon receiving such a room URL, a user may not necessarily know the room name where the meeting is taking place. This can be intentional, since the URL can be offered to both registered and unregistered users. For the latter users, a room name may not be meaningful or useful.

Figure 4:
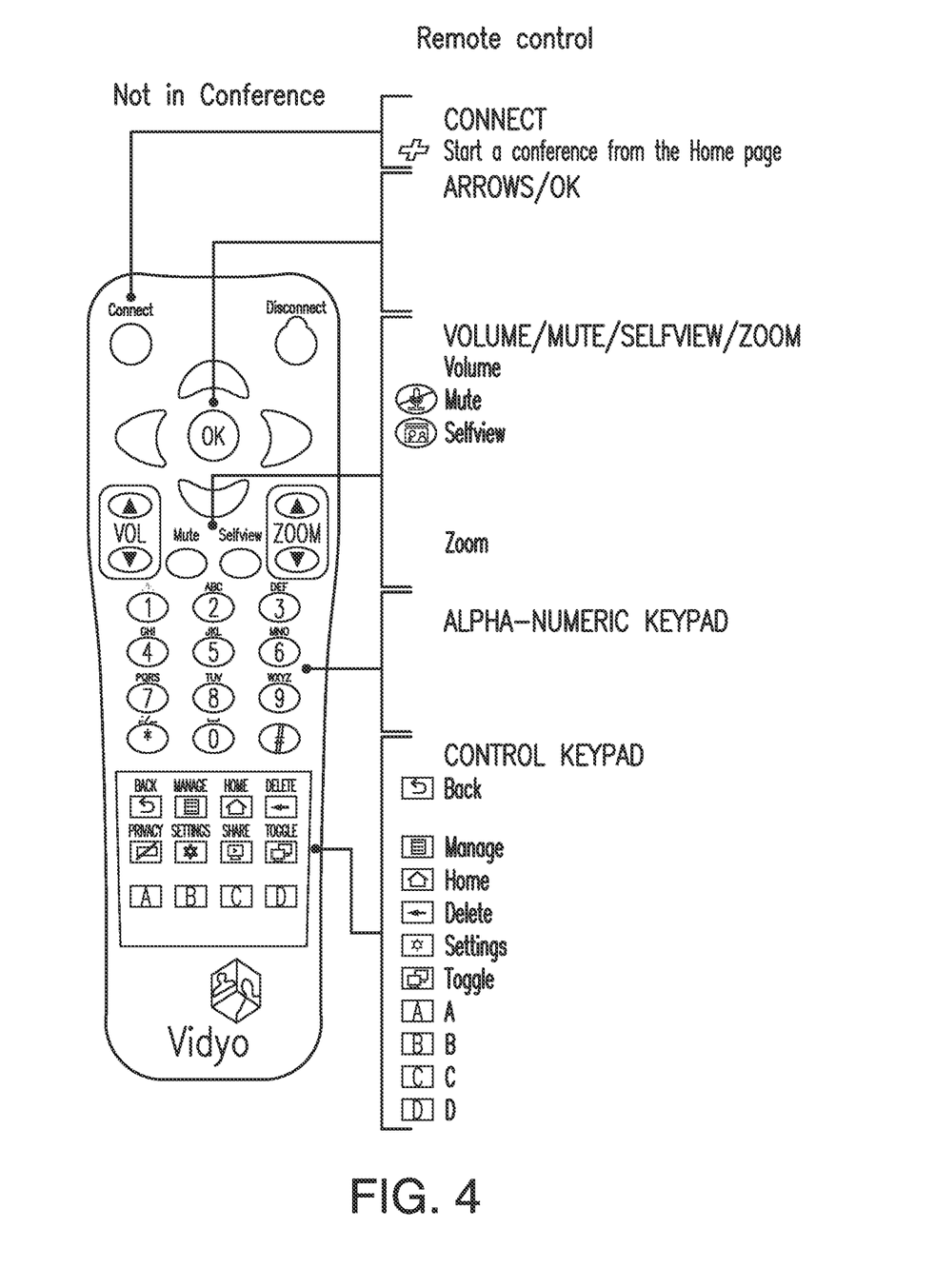
FIG. 4 shows an exemplary remote control unit in accordance with the disclosed subject matter.

In an exemplary embodiment of the disclosed subject matter, an alternative technique of bringing a room system into a conference can be provided. FIG. 4 depicts an exemplary remote control unit. For example, the remote control can be similar to the one depicted at "http://www.vidyo.com/documents/support/v2.2/VidyoRoom_User's_Guide_2.2.pdf" and incorporated herein by reference in its entirety. A legend for the remote control is set forth below in Table 1:

TABLE 1

Legend for Remote Control

| | |
|---|---|
| CONNECT | Start a conference from the Home page |
| ARROWS/OK | Use the arrow keys to navigate on-screen. The option you navigate to will be highlighted in green when activated. Press OK on the remote to select the option on-screen. |

TABLE 1-continued

Legend for Remote Control

| VOLUME/MUTE/ SFLFVIFW/Z00M | Volume | Not Applicable |
|---|---|---|
| | Mute | Not Applicable |
| | Selfview | Cycles through the Selfview modes: Single Screen Mode (shows preview) and Dual Screen Mode (shows the help screen on the first monitor and turns control to the camera while preview is shown on the second monitor) |
| | Zoom | Acts as a page up/page down for scrolling through search results on-screen |
| ALPHA-NUMERIC KEYPAD | | Use these keys in conjunction with the input modes on-screen to key in user names, passwords, speed dials, and search terms. |
| CONTROL KEYPAD | Back | Takes you to the previous screen in the VidyoRoom interface |
| | Manage | Brings up the remote control Help screen |
| | Home | Takes users to the home screen in the VidyoRoom interface |
| | Delete | Acts as a backspace when typing in a form field |
| | Settings | Brings up the Settings screen |
| | Toggle | Not applicable |
| | A | Multifunction key |
| | B | Multifunction key |
| | C | Multifunction key |
| | D | Toggles between numeric and alphanumeric data entry |

The button functionality shown in the FIG. 4 can refer to an exemplary case where the conferencing system has not yet joined a conference. For example, at this stage, the "Disconnect" button can have no use yet. Note that the remote control unit can feature a plurality, e.g. four, multifunction buttons, which can be at the bottom of the remote, and which can be labeled to denote their status as multifunction keys, e.g., "A" (red), "B" (green), "C" (yellow), and "D" (blue).

By way of example, the operation of the disclosed subject matter can be described in a hypothetical situation where a user wants to bring such a room system into a conference. The user can be registered on the portal, he/she can be already logged in on the portal, and can be already connected to the conference through his/her own device (e.g., a laptop, an iOS device such as an iPad or iPhone, or an Android device including phones, tablets, etc.). The portal can offer the user the option to bring a room system into the conference call.

Figure 5A:
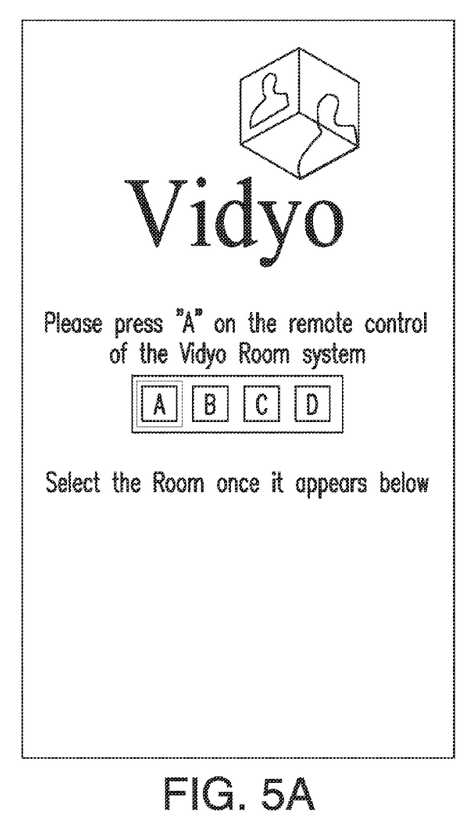
FIGS. 5A-D provide exemplary screen snapshots during the process of adding a room system to a conference in accordance with the principles of the disclosed subject matter.

When the user selects that option, in an exemplary embodiment of the disclosed subject matter, the portal can display a page such as the one shown in FIG. 5A instructing the user to press a predefined button on the remote control of the room system that he/she wants to bring into the conference. In an exemplary embodiment of the disclosed subject matter, the predefined button of the remote control can be the "A" multifunction button, as shown in FIG. 4. When the user presses the "A" button on the remote, the room system can communicate with the server and makes itself available to be connected for a certain period of time. In an exemplary embodiment of the disclosed subject matter, the time out period may be 10 seconds. Note that the room system may not know yet which the conference to which it is supposed to be connected. The room system can make itself available to be connected at the request of the portal.

Figure 5B:
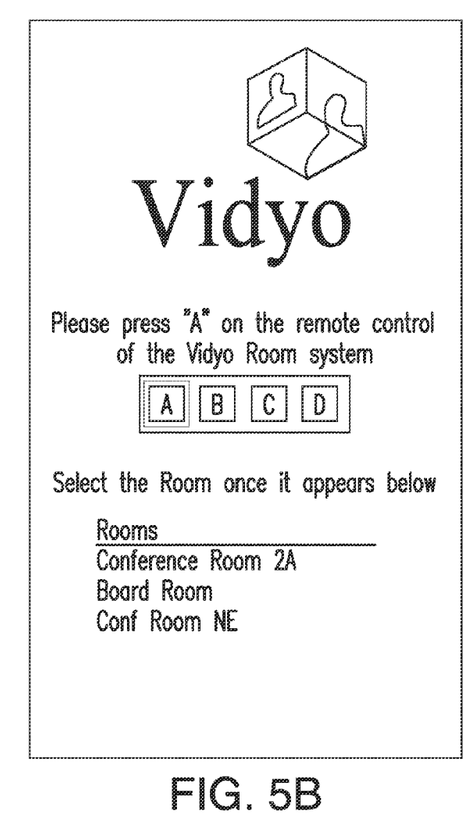

By way of example, the portal can display on the page shown to the user the list of room systems that have made themselves available to be connected. FIG. 5B shows an example where three systems have made themselves available to be connected: "Conference Room 2A," "Board Room," and "Conf Room NE."

Figure 5C:
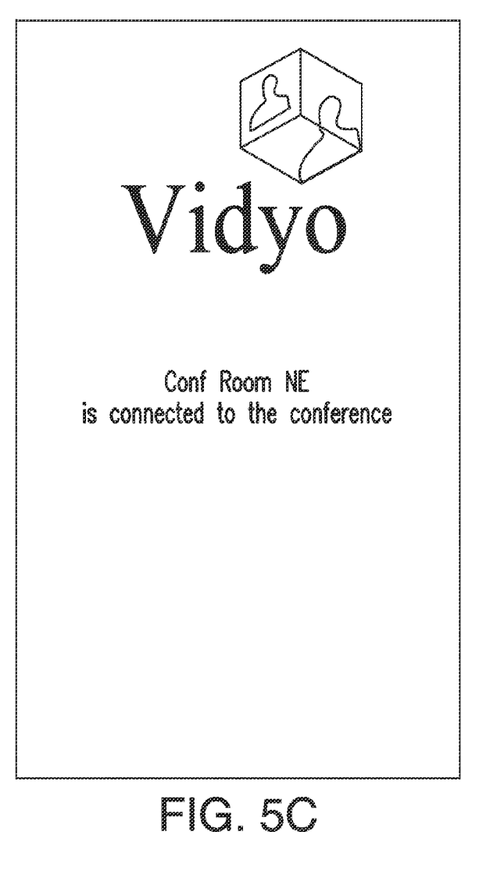

For example, the user can select "Conf Room NE" on the interface. When the user makes such a selection, the portal can communicate with the selected room system to indicate that it has been selected to join the conference and connects it to the conference in which the user is currently participating, or instructs it to do so itself. Upon successful connection, the portal can confirm the choice as shown in FIG. 5C, where the portal can indicate that "Conf Room NE" room system is connected to the conference.

The aforementioned operation can be referred to as "room pairing." Note that the room system can connect to the conference without requiring information about the conference details. In other words, the room can connect without requiring configuration to be performed on the room system itself. Furthermore, the technique can be secure because it can require physical access to the remote control of the room system. Authentication can be performed on the user that initiates the "pairing" process on his/her own device.

Figure 5D:
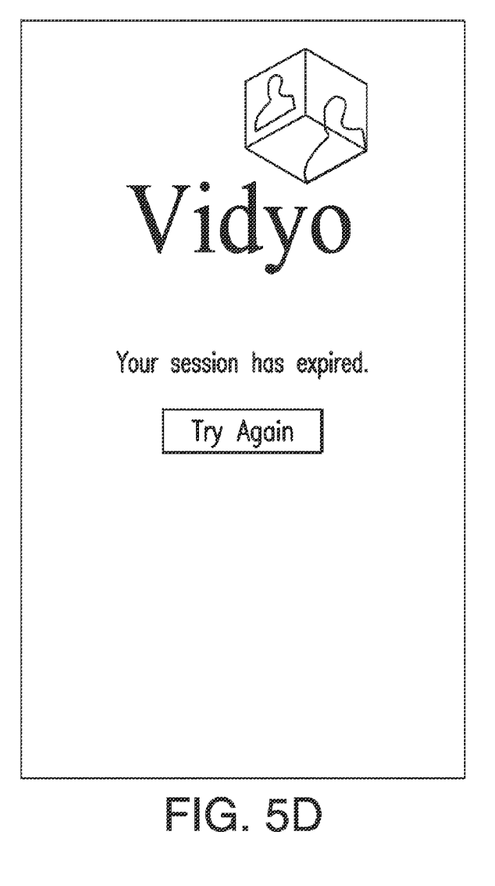

By way of example, if the pairing button "A" is pressed and the room system is not selected into any conference, the process can time out and the room system can operate as normal. If, on the other hand, the user initiates the room pairing process as shown in FIG. 5A but makes no further selection, then the portal can time out the process and display, for example, a page such as the one shown in FIG. 5D.

In order for the user to be able to see room systems that make themselves available to be connected, the user and the room systems both can be on the same portal.

By way of example, the room pairing functionality also can be accessed through a separate URL that can be communicated, e.g., via email or a calendar invitation, together with the room URL. In such a case, the functionality also can be offered to participating users that are not registered users on the particular portal that is used for the conferencing session yet have physical access to room systems associated with that portal. The pairing functionality also can be on the same landing page accessed through the room URL, such as the one that can be shown after the login/connection process initiated through the page depicted in FIG. 3.

By way of example, the pairing functionality also can be made available on the client software that runs on the endpoint, e.g., the user's computer, laptop, or other portable device. In an exemplary embodiment, the software can display a list of room systems as provided by the portal, or it can open up a browser window that can automatically direct the user to the correct portal URL in order to access the pairing functionality.

The methods for room system pairing in video conferencing described above can be implemented as computer software using computer-readable instructions and physically stored in computer-readable medium. The computer software can be encoded using any suitable computer languages. The software instructions can be executed on various types of computers. For example, FIG. 6 illustrates an exemplary computer system 600 suitable for implementing exemplary embodiments of the disclosed subject matter.

Figure 6:
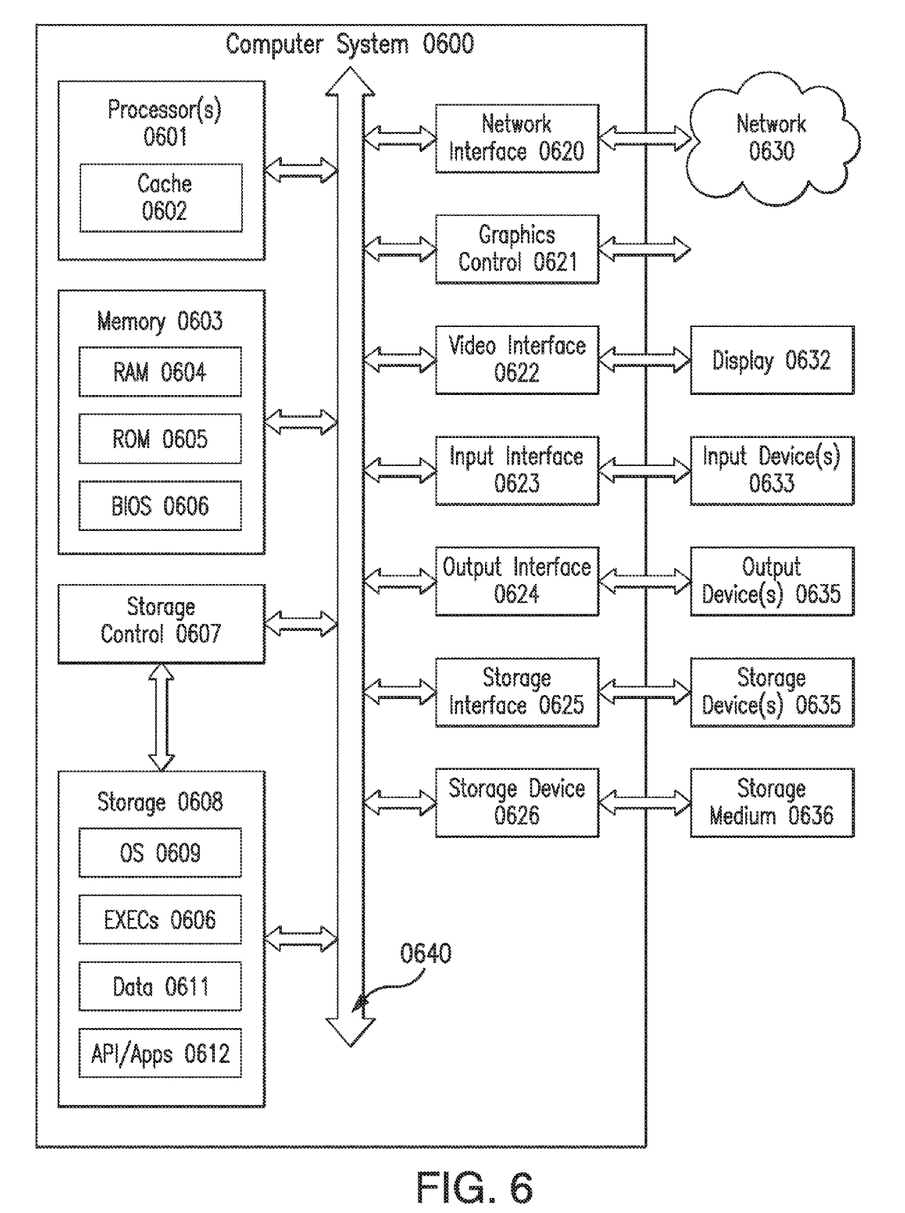
FIG. 6 depicts an exemplary computer system for implementing one or more embodiments of the disclosed subject matter.

By way of example, the components shown in FIG. 6 for computer system 600 are exemplary in nature and are not intended to suggest any limitation as to the scope of use or functionality of the computer software implementing embodiments of the disclosed subject matter. The configuration of components should not be interpreted as having any dependency or requirement relating to any one or combination of components illustrated in the exemplary embodiment of a computer system. Computer system 600 can have many physical forms including an integrated circuit, a printed circuit board, a small handheld device (such as a mobile telephone or PDA), a personal computer or a super computer.

Computer system 600 can include a display 632, one or more input devices 633 (e.g., keypad, keyboard, mouse, stylus, etc.), one or more output devices 634 (e.g., speaker), one or more storage devices 635, and various types of storage media 636.

The system bus 640 can link a wide variety of subsystems. As understood by those skilled in the art, a "bus" can refer to a plurality of digital signal lines serving a common function. The system bus 640 can be any of several types of bus structures including a memory bus, a peripheral bus, and a local bus using any of a variety of bus architectures. By way of example and not limitation, such architectures can include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 601 (also referred to as central processing units, or CPUs) optionally can contain a cache memory unit 602 for temporary local storage of instructions, data, or computer addresses. Processor(s) 601 can be coupled to storage devices including memory 603. Memory 603 can include random access memory (RAM) 604 and read-only memory (ROM) 605. As is well known in the art, ROM 605 can act to transfer data and instructions uni-directionally to the processor(s) 601, and RAM 604 can be used to transfer data and instructions in a bi-directional manner. Both of these types of memories can include any suitable of the computer-readable media described below.

A fixed storage 608 also can be coupled bi-directionally to the processor(s) 601, optionally via a storage control unit 607. It can provide additional data storage capacity and can also include any of the computer-readable media described below. Storage 608 can be used to store operating system 609, EXECs 610, application programs 612, data 611 and the like and can be a secondary storage medium (such as a hard disk) that is slower than primary storage. It should be appreciated that the information retained within storage 608, can, in appropriate cases, be incorporated in standard fashion as virtual memory in memory 603.

Processor(s) 601 also can be coupled to a variety of interfaces such as graphics control 621, video interface 622, input interface 623, output interface 624, storage interface 625, and these interfaces in turn can be coupled to the appropriate devices. In general, an input/output device can be any of video displays, track balls, mice, keyboards, microphones, touch-sensitive displays, transducer card readers, magnetic or paper tape readers, tablets, styluses, voice or handwriting recognizers, biometrics readers, or other computers. Processor(s) 601 can be coupled to another computer or telecommunications network 630 using network interface 620. With such a network interface 620, it can be contemplated that the CPU 601 might receive information from the network 630, or might output information to the network in the course of performing the above-described method. Furthermore, method embodiments of the disclosed subject matter can execute solely upon CPU 601 or can execute over a network 630 such as the Internet in conjunction with a remote CPU 601 that shares a portion of the processing.

According to various embodiments, when in a network environment, i.e., when computer system 600 is connected to network 630, computer system 600 can communicate with other devices that are also connected to network 630. Communications can be sent to and from computer system 600 via network interface 620. For example, incoming communications, such as a request or a response from another device, in the form of one or more packets, can be received from network 630 at network interface 620 and stored in selected sections in memory 603 for processing. Outgoing communications, such as a request or a response to another device, again in the form of one or more packets, can also be stored in selected sections in memory 603 and sent out to network 630 at network interface 620. Processor(s) 601 can access these communication packets stored in memory 603 for processing.

In addition, embodiments of the present disclosure further can relate to computer storage products with a computer-readable medium that can have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the disclosed subject matter does not encompass transmission media, carrier waves, or other transitory signals.

As an example and not by way of limitation, the computer system having architecture 600 can provide functionality as a result of processor(s) 601 executing software embodied in one or more tangible, computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface. The software can cause processor(s) 601 to execute particular processes or particular parts of particular processes described herein, including defining data structures stored in memory 603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The disclosed subject matter encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A digital audiovisual communication system for performing conferencing sessions over a communication network, the system comprising:
   a room system configured to communicate with a portal through the communication network;
   an end-user device configured to communicate with the portal through the communication network;
   wherein the room system is configured to enter a pairing mode state for a period of time at the request of its user, and to indicate the pairing mode state to the portal, wherein the pairing mode state indicates the room system is available for connection to a conferencing session via the portal;
   wherein the portal is configured, in response to the pairing mode state, to indicate to the end-user device that the portal has received an indication from the room system for the pairing mode state;
   wherein the end-user device is configured to display to the end-user information about the room system that is in the pairing mode state such that the end-user is given an option to select the room system for inclusion to the end-user's conferencing session;
   wherein the end-user device is further configured to receive a selection of the room indication from the end user and to indicate the selection to the portal; and
   wherein the portal is further configured, in response to the selection, to instruct the room system to join the end-user's conferencing session.

2. The system of claim 1 wherein the room system further comprises a remote control featuring a number of buttons, including a button assigned for pairing, and wherein the request of its user to enter the pairing mode state comprises pressing the pairing button.

3. The system of claim 1 wherein the end-user device comprises a web server and a web browser, wherein the web server is configured to communicate with the portal and wherein the web browser is configured to access conferencing information through the web server over the communication network.

4. A method for performing conferencing sessions over a communication network with a digital audiovisual communication system, the system comprising:
   a room system configured to communicate with a portal through the communication network; and
   an end-user device configured to communicate with the portal through the communication network;
   the method comprising:
   entering a pairing mode state, by the room system, for a period of time at the request of its user, wherein the pairing mode state indicates the room system is available for connection to a conferencing session via the portal;
   indicating the pairing mode state to the portal;
   in response to the pairing mode state, indicating to the end-user device, by the portal, that the portal received an indication from the room system for the pairing mode state; and
   displaying to the end-user, by the end-user device, information about the room system that is in the pairing mode state such that the end-user is given an option to select the room system for inclusion to the end-user's conferencing session;
   receiving a selection of the room indication from the end user and indicating the selection to the portal, by the end-user device; and
   in response to the selection, instructing the room system, by the portal, to join the conferencing session.

5. The method of claim 4 wherein the room system further comprises a remote control featuring a number of buttons, including a button assigned for pairing, and wherein the request of its user to enter the pairing mode state comprises pressing the pairing button.

6. The method of claim 4 wherein the end-user device comprises a web server and a web browser, wherein the web server is configured to communicate with the portal and the web browser is configured to access conferencing information through the web server over the communication network.

7. A non-transitory computer readable medium comprising a set of executable instructions to direct a processor to perform the methods in one of claims 4 to 6.

* * * * *